(12) United States Patent
Lueder

(10) Patent No.: US 6,559,918 B1
(45) Date of Patent: May 6, 2003

(54) FLEXIBLE LIQUID CRYSTAL DISPLAY DEVICE WITH IMPROVED MECHANICAL ABILITY

(75) Inventor: Ernst Lueder, Stuttgart (DE)

(73) Assignee: Institut fuer Netzwerk- und Systemtheorie Labor fuer Bildschirmtechnik, Stuttgart (DE)

( * ) Notice: Subject to any disclaimer, the term of this patent is extended or adjusted under 35 U.S.C. 154(b) by 0 days.

(21) Appl. No.: 09/285,922

(22) Filed: Apr. 2, 1999

(30) Foreign Application Priority Data

May 16, 1999 (DE) .......................... 198 22 150

(51) Int. Cl.[7] .............................................. G02F 1/133
(52) U.S. Cl. ...................................... 349/172; 349/159
(58) Field of Search ................................ 349/113, 159, 349/172, 171

(56) References Cited

U.S. PATENT DOCUMENTS

| | | | |
|---|---|---|---|
| 5,130,830 A | * 7/1992 | Fukushima et al. | 349/172 |
| 5,307,190 A | 4/1994 | Wakita et al. | |
| 5,332,521 A | 7/1994 | Yuasa et al. | |
| 5,495,351 A | * 2/1996 | Shingaki et al. | 349/74 |
| 5,568,287 A | 10/1996 | Shingaki et al. | |
| 5,847,790 A | * 12/1998 | Andersson et al. | 349/100 |
| 5,948,486 A | * 9/1999 | Sage et al. | 428/1 |
| 6,111,631 A | * 8/2000 | Funfshilling et al. | 349/172 |

FOREIGN PATENT DOCUMENTS

DE      196 49 761 A1    6/1998

OTHER PUBLICATIONS

Patent Abstract of Japan, vol. 096, No. 002, Feb. 29, 1996 & JP 07 287223 A.
Patent Abstract of Japan vol. 014, No. 501 Nov. 2, 1990 & JP 02 208096.

* cited by examiner

Primary Examiner—Kenneth Parker
(74) Attorney, Agent, or Firm—Michael J. Striker

(57) ABSTRACT

The liquid crystal display has a liquid crystal cell (15) containing a bistable ferroelectric liquid crystal (12). The liquid crystal cell (15) is a quarter wave cell and includes two opposing covering electrodes (13) arranged in a flexible, preferably plastic, substrate (11) on opposite sides of the bistable ferroelectric liquide crystal (12) and spacers (16) distributed between the covering electrodes (13). A diffuser or reflector (18) is arranged on a rear side of the substrate (11) so that light passes twice through the liquid crystal cell (15). The bistable liquid crystal display with the quarter wave liquid crystal cell is flexible but mechanically stable to mechanical impacts, torsion and bending. Orienting layers (14) for the liquid crystal are applied obliquely or diagonally to the surface of the substrate.

19 Claims, 1 Drawing Sheet

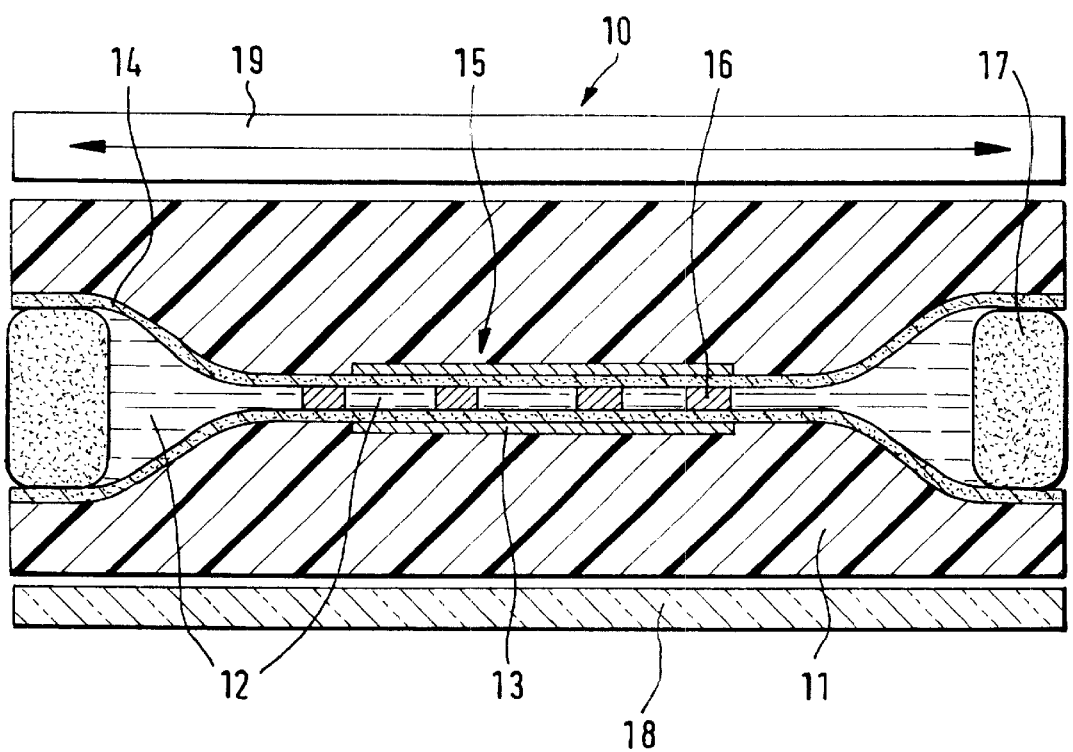

FLEXIBLE LIQUID CRYSTAL DISPLAY DEVICE WITH IMPROVED MECHANICAL ABILITY

BACKGROUND OF THE INVENTION

The present invention relates to a liquid crystal display device comprising a substrate made of a flexible material, preferably a plastic foil substrate, and a liquid crystal cell containing a bistable ferroelectric liquid crystal arranged between covering electrodes.

This type of display device has already been described in German Published Patent Application DE 196 49 761.2. Ferroelectric liquid crystals are known for their rapid and bistable switching properties. However displays made using these crystals are usually impact sensitive and react by loosing written information as soon as a material flow occurs in the interior of the crystal layer. In the known foil displays with ferroelectric liquid crystals this problem is minimized by using special thin foil substrates and by using a liquid crystal with a so-called "bookshelf" texture.

SUMMARY OF THE INVENTION

It is an object of the present invention to provide a ferroelectric liquid crystal display device with a flexible substrate, which has a higher mechanical stability than currently known displays.

This object and others which will be made more apparent hereinafter are attained in a liquid crystal display device comprising a liquid crystal cell containing a bistable ferroelectric liquid crystal arranged between covering electrodes and a substrate made from flexible material, preferably a plastic foil substrate.

According to the invention the optical thickness of the liquid crystal cell is a fourth of the wavelength of light and spacers are arranged between the covering electrodes. Preferably the spacers are at a distance of from 40 to 60 $\mu$m from each other.

The shear force that acts on the crystal layer of this display device depends strongly on its thickness. By using a liquid crystal cell according to the invention having an optical thickness that corresponds to a quarter of the wavelength of light, the impact sensitivity is thus clearly reduced. The spacers also increase the mechanical stability of the display device by themselves, so that the display device resists compression, bending and torsion. A diffuser or a reflector can be arranged on the rear side of the display device, which insures that light passes through the quarter wave cell twice. Because of that the liquid crystal cell according to the invention has a thickness, which amounts to about 0.8 $\mu$m, which is about half that for cells of the currently known liquid crystal display devices. The spacers arranged between the covering electrodes of the liquid crystal cells can have a thickness of about 0.8 $\mu$m corresponding to that of the cells and a diameter of about 15 $\mu$m and preferably have plane surfaces on each end or side. These spacers may be made by photolithography or printing techniques. The spacers can however also be provided with an adhesive layer and can be distributed on the covering electrodes. Orienting layers for the liquid crystal comprising $SiO_x$ or $Ta_2O_5$ layers can be deposited by evaporation or spraying on the cover layers, obliquely or diagonally to the substrate surface. This type of orienting layer exerts a great anchoring influence on the molecules of the liquid crystal material. An additional increase in the mechanical stability may be obtained by producing a low pressure in the liquid crystal cell. The mechanical properties of a display device according to the invention having about 3 $cm^2$ surface area include typically a compressive load over 120 $N/cm^2$, a bending radius of less than 1.5 cm and a switching potential of under 5 V at temperatures of 0° C. to 60° C.

BRIEF DESCRIPTION OF THE DRAWING

The objects, features and advantages of the invention will now be illustrated in more detail with the aid of the following description of the preferred embodiment, with reference to the accompanying sole FIGURE that is a cross-sectional view of a preferred embodiment of the display device according to the invention.

DESCRIPTION OF THE PREFERRED EMBODIMENT

The sole FIGURE shows a cross-sectional view of one embodiment of a display device 10 according to the invention. The display device includes a flexible substrate 11 made from a flexible plastic material and a liquid crystal cell 15 containing a bistable ferroelectric liquid crystal 12. In the liquid crystal cell 15 the liquid crystal 12 is arranged between two electrodes 13 and two orienting layers 14. The spacers 16 distributed between the two orienting layers 14 as shown in the figure determine the thickness of the liquid crystal cell. The orienting layers 14 are made from obliquely or diagonally deposited $SiO_x$ layers deposited by vacuum vaporization or spraying. A low pressure can also be provided in the liquid crystal cell 15 by an adhesive border 17 arranged laterally around the display device 10 that is admixed with unshown spacer elements, for example gold-coated polymeric spheres. These polymeric spheres can also act at the same time to provide a contact for the opposing plate. A reservoir for the liquid crystal, which can also contain vacuoles, arises along the relatively thick adhesive border 17. A diffuser or mirror 18 is also arranged on the rear side or the display device 10, which causes light to pass twice through the liquid crystal cell 15. In this manner the optical thickness of the liquid crystal cell can be reduced to a fourth of the wavelength of the light. A polarizer 19 is provided on the visible side of the display device 10.

The term "wavelength of light" in the specification and appended claims means the average wavelength of visible light passing through the liquid crystal.

The term "low pressure" means a pressure below normal atmospheric pressure.

The disclosure in German Patent Application 198 22 150.9 of May 16, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a liquid crystal display device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A liquid crystal display device comprising
   a flexible substrate (11) made from a flexible material; and
   a liquid crystal cell (15) containing a bistable ferroelectric liquid crystal (12) arranged between opposing covering electrodes (13) and spacers (16) arranged between the covering electrodes (13);
   wherein the liquid crystal cell (15) is a quarter wave cell.

2. The liquid crystal display device as defined in claim 1 or 6, wherein said flexible substrate is a plastic foil substrate.

3. The liquid crystal display device as defined in claim 1, wherein said spacers (16) are distributed at a distance of from 40 to 60 $\mu$m from each other in said liquid crystal cell (15).

4. The liquid crystal display device as defined in claim 1 or 6, wherein said liquid crystal cell (15) has a thickness of about 0.8 $\mu$m.

5. The liquid crystal display device as defined in claim 1 or 6, further comprising respective orienting layers (14) applied to the opposing covering electrodes (13) for said liquid crystal (12), and wherein said respective orienting layers comprise at least one $SiO_x$ or $Ta_2O_5$ layer deposited by vacuum vaporization or spraying over the electrodes and obliquely or diagonally inclined to a surface of said substrate.

6. A liquid crystal display device comprising
   a flexible substrate (11) made from a flexible material;
   a liquid crystal cell (15) containing a bistable ferroelectric liquid crystal (12) arranged between opposing covering electrodes (13) and spacers (16) arranged between the covering electrodes (13); and
   a diffuser or reflector (18) on a rear side of said substrate opposite from said liquid crystal cell (15);
   whereby the liquid crystal cell (15) is a quarter wave cell.

7. The liquid crystal display device as defined in claim 1, where said spacers (16) each have a thickness of about 0.8 $\mu$m and a diameter of about 15 $\mu$m.

8. The liquid crystal display device as defined in claim 7, wherein opposite sides or ends of said spacers (16) have plane surfaces thereon.

9. The liquid crystal display device as defined in claim 1, wherein said spacers (16) each have an adhesive coating and are distributed on said covering electrodes (13) of said liquid crystal cell (15).

10. The liquid crystal display device as defined in claim 1, further comprising a low pressure in the liquid crystal cell.

11. A liquid crystal display device comprising
    a liquid crystal cell (15) consisting of a quarter wave cell and containing a bistable ferroelectric liquid crystal (12), said liquid crystal cell (15) comprising two opposing covering electrodes (13) arranged on opposite sides of said bistable ferroelectric liquid crystal (12) and spacers (16) distributed between said covering electrodes;
    a flexible substrate (11) made from a flexible plastic material, in which said liquid crystal cell (15) is arranged; and
    a diffuser or reflector (18) arranged on a rear side of said substrate (11) so that light passes twice through said liquid crystal cell (15).

12. The liquid crystal display device as defined in claim 11, wherein said spacers (16) each have a thickness of about 0.8 $\mu$m.

13. The liquid crystal display device as defined in claim 11, further comprising respective orienting layers (14) for said bistable ferroelectric liquid crystal (12) and wherein said respective orienting layers (14) are applied to the opposing covering electrodes (13) and each comprise at least one $SiO_x$ or $Ta_2O_5$ layer obliquely or diagonally deposited by vacuum vaporization or spraying over the covering electrodes.

14. The liquid crystal display device as defined in claim 13, further comprising an adhesive border (17) extending around a periphery of said liquid crystal cell (15) between said orienting layers (14) so as to form a reservoir for said bistable ferroelectric liquid crystal (12).

15. A flexible liquid crystal display device comprising
    a single liquid crystal cell (15) consisting of a quarter wave cell and containing a single bistable ferroelectric liquid crystal (12) and means for switching said bistable ferroelectric liquid crystal between two states, said means for switching said bistable ferroelectric liquid crystal comprising two opposing covering electrodes (13) arranged on opposite sides of said single bistable ferroelectric liquid crystal (12) and spacers (16) distributed between said covering electrodes;
    a flexible substrate (11) made from a flexible plastic material, within which said liquid crystal cell (15) is arranged; and
    wherein the liquid crystal cell (15) is a quarter wave cell.

16. The flexible liquid crystal display device as defined in claim 15, further comprising respective orienting layers (14) for said bistable ferroelectric liquid crystal (12) and wherein said respective orienting layers (14) are arranged between said opposing covering electrodes (13) and said bistable ferroelectric liquid crystal (12) and said orienting layers (14) each comprise at least one $SiO_x$ or $Ta_2O_5$ layer obliquely or diagonally deposited by vacuum vaporization or spraying over the covering electrodes.

17. A flexible liquid crystal display device comprising
    a flexible substrate (11) consisting of a flexible plastic material;
    a liquid crystal cell (15) arranged within said flexible substrate (11), said liquid crystal cell (15) consisting of a quarter wave cell and wherein said liquid crystal cell (15) comprises a bistable ferroelectric liquid crystal (12), opposing covering electrodes (13) for switching said bistable ferroelectric liquid crystal between two states, said covering electrodes (13) being arranged on opposite sides of said liquid crystal, a plurality of spacers (16) distributed between said covering electrodes (13) to provide mechanical stability and maintain thickness, and respective orienting layers (14) for said bistable ferroelectric liquid crystal (12) arranged between said covering electrodes (13) and said bistable ferroelectric liquid crystal (12), said orienting layers (14) each comprising at least one $SiO_x$ or $Ta_2O_3$ layer obliquely or diagonally deposited by vacuum vaporization or spraying over the covering electrodes; and
    an adhesive border (17) extending around a periphery of said liquid crystal cell (15) between said orienting layers (14) so as to form a reservoir for said bistable ferroelectric liquid crystal (12) and wherein a low pressure exists within said reservoir.

18. The flexible liquid crystal display device as defined in claim 17, wherein said spacers (16) each have a thickness of about 0.8 $\mu$m and further comprising a diffuser or reflector (18) arranged on a rear side of said substrate (11) so that light passes twice through said liquid crystal cell (15).

19. The flexible liquid crystal display device as defined in claim 18, having a bending radius of less than 1.5 cm and a switching potential of under 5 V between 0° C. and 60° C.

* * * * *

UNITED STATES PATENT AND TRADEMARK OFFICE
CERTIFICATE OF CORRECTION

PATENT NO. : 6,559,918 B1  Page 1 of 1
APPLICATION NO. : 09/285922
DATED : May 6, 2003
INVENTOR(S) : Lueder It is certified that error appears in the above-identified patent and that said Letters Patent is hereby corrected as shown below:

On the title page item (73) delete "Institute fuer Netzwerk- und Systemtheorie Labor fuer Bildschirmtechnik" and substitute --Universitaet Stuttgart--

Signed and Sealed this

Fifteenth Day of January, 2008

JON W. DUDAS
*Director of the United States Patent and Trademark Office*